US006795204B1

United States Patent
Hirsch

(10) Patent No.: US 6,795,204 B1
(45) Date of Patent: Sep. 21, 2004

(54) CONTROLLING BY MEANS OF A PC-FAX LINK A TELEPHONE TERMINAL CONNECTED TO A FAX MACHINE

(75) Inventor: Lucian Hirsch, München (DE)

(73) Assignee: Siemens Aktiengesellschaft, Munich (DE)

( * ) Notice: Subject to any disclaimer, the term of this patent is extended or adjusted under 35 U.S.C. 154(b) by 933 days.

(21) Appl. No.: 08/765,258
(22) PCT Filed: Jun. 21, 1995
(86) PCT No.: PCT/DE95/00804
§ 371 (c)(1),
(2), (4) Date: Dec. 20, 1996
(87) PCT Pub. No.: WO96/00476
PCT Pub. Date: Jan. 4, 1996

(30) Foreign Application Priority Data
Jun. 27, 1994 (DE) .......................................... 44 22 343

(51) Int. Cl.⁷ ............................ G06F 15/00; H04N 1/32
(52) U.S. Cl. ...................................... 358/1.15; 358/442
(58) Field of Search ............................... 358/440, 442, 358/434, 404, 468, 444; 379/100.01, 100.06, 100.14, 100.16, 101.01, 88.01, 88.02, 93.09, 93.14, 100.15; 380/19, 25

(56) References Cited

U.S. PATENT DOCUMENTS

| 4,578,537 A | * | 3/1986 | Faggin et al. ............. 179/2 DP |
| 4,860,342 A | * | 8/1989 | Danner ......................... 379/96 |
| 4,902,881 A | * | 2/1990 | Janku .......................... 235/381 |
| 5,228,128 A | * | 7/1993 | Kim ............................. 358/442 |
| 5,303,067 A | * | 4/1994 | Kang et al. .................. 358/442 |
| 5,357,562 A | * | 10/1994 | Metser et al. ................. 379/67 |
| 5,383,030 A | * | 1/1995 | Seo ............................. 358/442 |
| 5,515,423 A | * | 5/1996 | Beck et al. .................... 379/93 |
| 5,533,105 A | * | 7/1996 | Brown et al. ................. 379/93 |
| 5,553,122 A | * | 9/1996 | Haber et al. .................. 379/90 |
| 5,559,721 A | * | 9/1996 | Ishii ........................... 358/442 |
| 5,631,745 A | * | 5/1997 | Wong et al. ................. 358/442 |
| 5,666,397 A | * | 9/1997 | Lamons et al. ............... 379/34 |
| 5,720,014 A | * | 2/1998 | Ikeda et al. .................. 395/114 |
| 5,801,757 A | * | 9/1998 | Saulsbury ..................... 348/17 |
| 5,844,970 A | * | 12/1998 | Hsu ......................... 379/93.24 |
| 5,847,844 A | * | 12/1998 | Minamizawa ............... 358/442 |

FOREIGN PATENT DOCUMENTS

| DE | 41 06 455 A1 | 3/1992 |
| DE | 0 630 141 A2 | 12/1994 |
| EP | 0 426 412 A2 | 5/1991 |
| GB | 2 258 787 | 2/1993 |
| JP | 07-321996 | 12/1995 |
| WO | WO 90/10989 | 9/1990 |
| WO | WO 92/16069 | 9/1992 |
| WO | WO 93/20647 | 10/1993 |

OTHER PUBLICATIONS

Telcom Report, vol. 15, No. 1, Jan./Feb. 1992 p. 48–50, No Translation.
Telcom Report 17, Jan./Feb. 1994 p. 42–43, No Translation.

* cited by examiner

*Primary Examiner*—An Vinh Nguyen
(74) *Attorney, Agent, or Firm*—Bell, Boyd & Lloyd LLC

(57) ABSTRACT

At the PC there are formed control commands not only for operating the fax machine, but at the same time for the establishment of outgoing voice links of the telephone terminal connected to the fax machine.

18 Claims, 1 Drawing Sheet

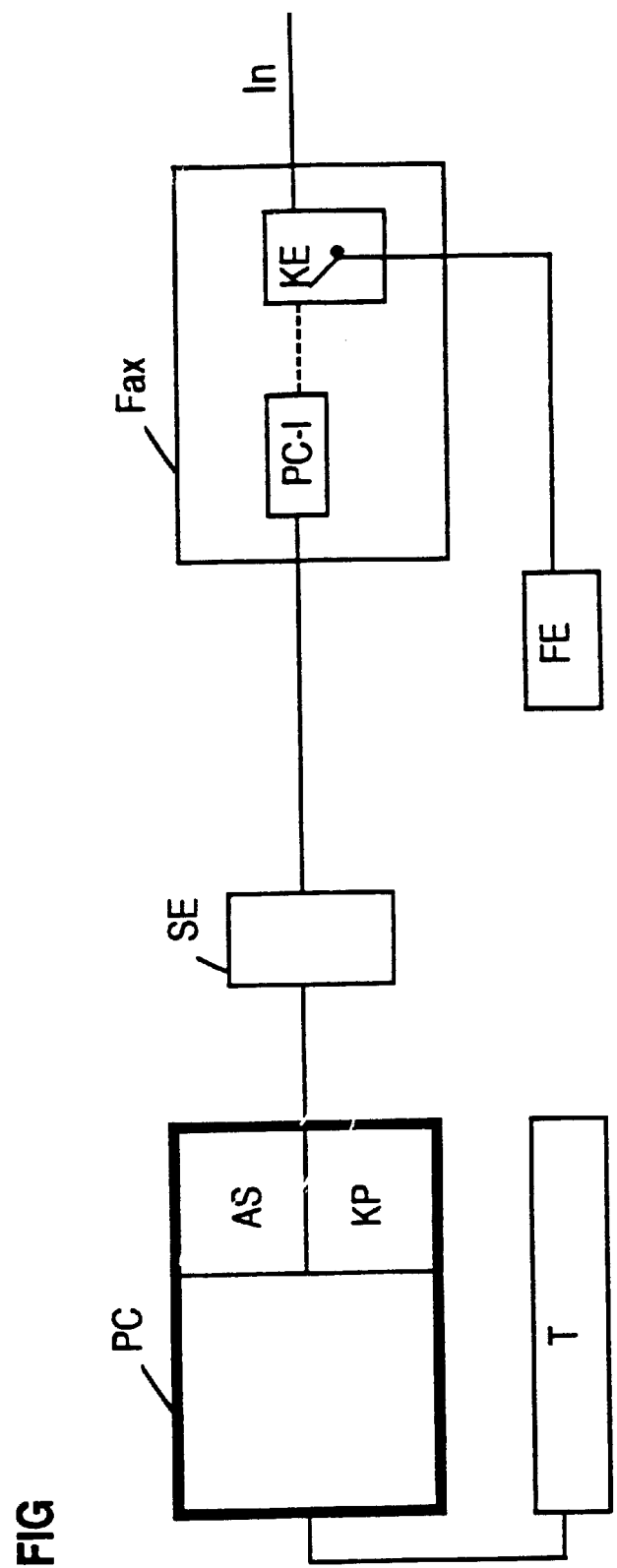

CONTROLLING BY MEANS OF A PC-FAX LINK A TELEPHONE TERMINAL CONNECTED TO A FAX MACHINE

BACKGROUND OF THE INVENTION

As different communication services are increasingly used, there are an increasing number of workplaces at which not only a personal computer but also a facsimile terminal and a telephone terminal are provided. Usually, each of these communication terminals has its own user interface and is used independently of the other communication terminals of the same workplace. However, it is also already known German reference (DE-A-41 06 454) to use the user interface and additional applications of a personal computer for the communication with a facsimile terminal.

SUMMARY OF THE INVENTION

The invention is based on this known communication scenario and accordingly relates to a method of controlling the communication between a personal computer and a facsimile terminal, connected to the latter via an interface means and having an integrated communication means and a connected telephone terminal, by means of a main memory of the personal computer, for operating the link with the facsimile terminal, and a user control unit, for example keyboard, which is assigned to the personal computer and at which commands which can be converted into control commands for the facsimile terminal can be entered.

The object underlying the invention is to make it possible on the basis of this known method also to carry out telephoning using the user interface or from PC applications. This is achieved on the basis of the known method by it being possible by means of the user control means to enter additional commands and data, the commands being convertible into special control commands for establishing an outgoing voice link of the connected telephone terminal, with inclusion of the entered data, by means of the communication means.

It is to be regarded as the essence of the invention that a PC-fax link used for the intercommunication of the personal computer with a facsimile terminal is also used additionally for the telephone service. The special advantage associated with the invention is that the method can be carried out with any personal computer which is coupled via a bidirectional interface to a facsimile terminal and that no additional means (control modules, interface modules) are necessary to realize the method according to the invention. In particular with regard to the use of PC-fax links, increasing in practice, this is to be regarded as a particular advantage. What is more, the PC-fax interface means itself may be constructed and may operate in any way desired, ie. both bidirectional serial PC-fax interfaces and bidirectional parallel or SCSI interfaces may be used.

An advantageous development of the invention provides that a background program realizing the connection to the facsimile terminal is implemented in the personal computer. The background program may be realized by a so-called terminate-and-stay-resident program (TSR), for example in a multitasking environment. When the personal computer is switched on, the background program is started and constantly remains active in the background while the personal computer is switched on, without adversely affecting the applications running. This produces the advantage that an application which is active in the personal computer does not have to be closed in order to call up a separate communication program, but that automatic changing to the background program quickly enough for practical purposes is possible. The background program controls the exchange of messages and data in the personal computer between the latter and the facsimile terminal via the link between the two. This background program may be separate from the background program for the transmission of facsimile messages, known from DE-A-41 06 454, or integrated in it. In the latter case, it likewise registers facsimile messages arriving at the facsimile terminal, ensures constant readiness to receive and indicates the reception of the facsimile messages on the computer. Orders to send, with transmission after a time delay or with automatic redialling, can also be executed.

Use of the communication capability of the background program is advantageously initiated by a user control program, which can be called up by means of the user control unit and is independent of the PC-fax link, being implemented in the personal computer. This user control program can be used, for examples, to determine call numbers from a telephone directory stored in the main memory and pass them to the communication means of the facsimile terminal. There may in this case be separate directories or program routines for the fax and telephone applications or the fax and telephone functions are combined in one directory or one user control program.

It goes without saying that the user control program also allows, however, the passing on of call numbers which have been entered into the personal computer by means of the user control unit. In this context, it is to be regarded as particularly advantageous if there is installed as resident in the personal computer a scan program for scanning the screen memory, by means of which call numbers entered by means of the user control unit are converted from any desired PC applications into corresponding numerical information for the communication means of the facsimile terminal. For example, the call number may be entered at any desired point from any desired PC application. By the subsequent actuation of a key or a key combination on the user control unit, the program loaded to be resident in the background can be activated and scans the screen memory for a numerical combination. In this context, for example, each string of characters exclusively comprising numerals, or a string of characters distinctly characterized by other features, which is located at this point in time in the screen memory may be offered for selection as a possible call number; with positive acknowledgement of the correct string of characters by the user, for example by a corresponding key depression, this string of characters is passed in the form of a corresponding telephone-related special control command, which is embedded into an initialization block, to the communication means of the facsimile terminal and consequently in order to establish a communication link is realized.

A particularly advantageous realization of the method according to the invention provides that the control commands related to the PC-fax link and the telephone-related special control commands are formed in the same command language. Consequently, on the one hand the corresponding programs (user control program, background program) in the personal computer can be shared by facsimile and telephone applications, on the other hand the operating of the fax link and of the telephone link is made easier with regard to the similarity of the commands.

A fax order is advantageously distinguished from a telephone order by there being implemented in the facsimile terminal an interpreter program, by means of which a distinction between control commands and special control commands takes place. If, for example, the facsimile terminal is not involved in facsimile activities at a given time, a telephone order is accepted by an "order management" of the facsimile terminal and the communication means of the facsimile terminal is activated in the sense of starting the telephone-related establishment of a link. Further simplification of the operating of the combined communication terminal system can be achieved by a loudspeaker function being activated in the facsimile terminal by means of the communication means of the facsimile terminal during the establishment of an outgoing voice link of the telephone terminal. The user of the personal computer can thus continue using it (for example in the application running) until, for example, a called subscriber answers.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several FIGURES of which like reference numerals identify like elements, and in which:

The single FIGURE is a block diagram of the present invention.

DESCRIPTION OF THE PREFERRED EMBODIMENTS

A personal computer PC having a main memory AS, a keyboard T and communication software KP, running in the background, is connected via an interface means SE to a facsimile terminal Fax. An interpreter program. PC-I, assigned to the facsimile terminal Fax, has access to the link between the personal computer PC and facsimile terminal Fax and likewise to a communication means KE, which can switch a telephone terminal FE having a subscriber line in, for example for access to a public communication network. The diagrammatically represented interface means SE is designed as a V24 interface; an RS232 interface or the like can similarly be used. Seen from circuit engineering aspects, the interface means SE may be regarded respectively as integrated into the personal computer PC and into the facsimile terminal Fax.

It is assumed that a user selects by means of the keyboard T of the personal computer PC a telephone number from a PC-fax-oriented database available in the main memory AS. This database in the main memory AS can be freely configured by the PC user by new entries, changes or deletions of call numbers. The user may, however, also select a telephone number in a running PC application, for example a word processing program, in that, after actuating a specific key combination, the screen is searched for a previously entered valid telephone number and the entered telephone number is determined.

After determining the desired call number, the communication software KP, running in the background on the personal computer PC, forms on the basis of a specific combination of parameters in an initialization block a PC telephone order which is distinctly identifiable for a facsimile terminal Fax. Dependent on the connection of the facsimile terminal Fax to a main line or extension, the call number entered or selected by the user may be automatically supplemented by the exchange dialling tone.

The initialization block comprises details specifying the source and receptor of the message, the identification of the message receptor allowing a distinction to be drawn between a local facsimile terminal Fax (for example when printing out facsimile messages), a remote facsimile terminal (for example when sending a facsimile message) or else a telephone terminal FE (for example for establishing a telephone link). The initialization block contains further details, for example specifying whether and how many automatic redials are desired and at which time interval they are desired.

The interpreter program PC-I running in the facsimile terminal Fax interprets the special control command, issued by the personal computer PC, in the initialization block and identifies the telephone order. Subsequently, the order is accepted by an order management of the facsimile terminal Fax and the communication means KE of the facsimile terminal Fax is instructed to establish the link. In addition, the loudspeaker function in the facsimile terminal Fax is switched on; consequently, acoustic monitoring of the establishment of the link is possible for the PC user. However, loudspeaker functions of the personal computer or the loudspeaking functions of the telephone terminal FE may also be used. When the called subscriber has answered, the receiver of the telephone terminal FE is picked up by the PC user, and the communication means KE of the facsimile terminal Fax switches the connection through.

If a call is to be established from a remote telephone terminal to the telephone terminal FE of the facsimile terminal Fax, the communication means KE of the local facsimile terminal Fax takes the call request and triggers acoustic signalling, at least at the local telephone terminal FE, at the facsimile terminal Fax itself or, via control commands to the personal computer PC, there as well.

The subscriber, ie. user of the personal computer PC, may when establishing a call leave the receiver in place until the actual call begins if so desired, possibly with automatic redialling. This fact considerably increases convenience at the PC workplace.

In the case of incoming calls, "call waiting", ie. the indication of an outside call request while a telephone call is in progress, can be realized via the personal computer PC. For this purpose, the communication means KE of the facsimile terminal Fax generates a control command, which is sent to the personal computer PC and is identified by the background program of the personal computer PC and leads to the optical or acoustic indication of the "call waiting" at the personal computer PC.

After ending the call or replacing the receiver at the telephone terminal, the facsimile terminal Fax goes over into normal facsimile mode.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method of controlling a communication between a personal computer and a facsimile terminal, the facsimile terminal connected to the personal computer via an interface and having an integrated communication device and a connected telephone terminal, comprising the steps of:

operating, using a main memory of the personal computer, a link to the facsimile terminal;

entering commands into the personal computer for the telephone terminal;

converting the commands, at a user control unit which is assigned to the personal computer, into first control commands for the facsimile terminal, into special control commands; and establishing an outgoing voice link of the connected telephone terminal using the special control commands.

2. The method as claimed in claim 1, wherein a background program realizing the connection to the facsimile terminal is implemented in the personal computer.

3. The method as claimed in claim 1, wherein a user control program, which is called up by the user control unit, is implemented in the personal computer.

4. The method as claimed in claim 3, wherein the user control program is used to determine call numbers from a telephone directory stored in the main memory and pass the call numbers to the communication device of the facsimile terminal.

5. The method as claimed in claim 3 wherein the user control program is used to pass all numbers of the call numbers to the communication device of the facsimile terminal, the call numbers being entered into the personal computer by the user control unit.

6. The method as claimed in claim 1, wherein an input program is installed as resident in the personal computer, by which the call numbers entered by the user control unit are converted from any PC application into corresponding numerical information for the communication device of the facsimile terminal.

7. The method as claimed in claim 1 wherein the first control commands and the special control commands are formed in a common command language.

8. The method as claimed in claim 7, wherein an interpreter program is implemented in the facsimile terminal an interpreter program, by which a distinction between the first control commands and the special control commands takes place.

9. The method as claimed in claim 1, wherein a loudspeaker function of the telephone terminal is activated by the communication device of the facsimile terminal during an establishment of an outgoing voice link of said telephone terminal.

10. A method of controlling a communication between a personal computer and a facsimile terminal, the facsimile terminal connected to the personal computer via an interface and having an integrated communication device and a connected telephone terminal, comprising the steps of:

operating a link to the facsimile terminal;
entering commands for the telephone terminal;
converting the commands into special control commands for the telephone terminal; and
establishing an outgoing voice link of the connected telephone terminal according to the special control commands.

11. The method as claimed in claim 10, wherein a background program realizing the connection to the facsimile terminal is implemented in the personal computer.

12. The method as claimed in claim 10, wherein a user control program, which is called up by the user control unit, is implemented in the personal computer.

13. The method as claimed in claim 12, wherein the user control program is used to determine call numbers from a telephone directory stored in the main memory and pass the call numbers to the communication device of the facsimile terminal.

14. The method as claimed in claim 12 wherein the user control program is used to pass all numbers of the call numbers to the communication device of the facsimile terminal, the call numbers being entered into the personal computer by the user control unit.

15. The method as claimed in claim 10, wherein an input program is installed as resident in the personal computer, by which the call numbers entered by the user control unit are converted from any PC application into corresponding numerical information for the communication device of the facsimile terminal.

16. The method as claimed in claim 10, wherein the control commands and the special control commands are formed in a common command language.

17. The method as claimed in claim 16, wherein an interpreter program is implemented in the facsimile terminal, by which a distinction between the control commands and the special control commands takes place.

18. The method as claimed in claim 10, wherein a loudspeaker function of the telephone terminal is activated by the communication device of the facsimile terminal during an establishment of an outgoing voice link of said telephone terminal.

* * * * *